US007104924B2

(12) United States Patent
Hawkins

(10) Patent No.: US 7,104,924 B2
(45) Date of Patent: Sep. 12, 2006

(54) SYSTEM AND METHOD FOR CONTROLLING ENGINE IDLE SPEED BASED ON OPERATIONAL STATE SETTINGS

(75) Inventor: Jeffery Scott Hawkins, Farmington Hills, MI (US)

(73) Assignee: Detroit Diesel Corporation, Detroit, MI (US)

( * ) Notice: Subject to any disclaimer, the term of this patent is extended or adjusted under 35 U.S.C. 154(b) by 204 days.

(21) Appl. No.: 10/945,078

(22) Filed: Sep. 20, 2004

(65) Prior Publication Data

US 2006/0063642 A1 Mar. 23, 2006

(51) Int. Cl.
*B60W 10/04* (2006.01)

(52) U.S. Cl. .................................................... 477/111

(58) Field of Classification Search ................ 477/111, 477/203, 183

See application file for complete search history.

(56) References Cited

U.S. PATENT DOCUMENTS

| | | | | |
|---|---|---|---|---|
| 3,581,852 | A | | 6/1971 | Griffen |
| 4,162,714 | A | | 7/1979 | Correll |
| 4,354,466 | A | | 10/1982 | Dudley et al. |
| 4,532,592 | A | | 7/1985 | Citron et al. |
| 5,311,063 | A | | 5/1994 | Hubler |
| 5,480,364 | A | * | 1/1996 | Hilbert et al. ............. 477/107 |
| 5,628,290 | A | | 5/1997 | Iida et al. |
| 5,863,277 | A | * | 1/1999 | Melbourne .................. 477/203 |
| 5,893,816 | A | * | 4/1999 | Ashida ....................... 477/111 |
| 5,929,533 | A | * | 7/1999 | Streib ........................ 307/10.1 |
| 5,979,402 | A | | 11/1999 | Melbourne |
| 6,006,723 | A | | 12/1999 | Akabori et al. |
| 6,009,851 | A | | 1/2000 | Iida et al. |
| 6,274,944 | B1 | | 8/2001 | Letang |
| 6,535,811 | B1 | | 3/2003 | Rowland et al. |
| 6,699,155 | B1 | | 3/2004 | Nagasaka |

* cited by examiner

*Primary Examiner*—Dirk Wright
(74) *Attorney, Agent, or Firm*—Brooks Kushman P.C.

(57) ABSTRACT

A method for controlling engine idle speeds for an internal combustion engine. The method includes operating the engine at a first idle speed when a first device is in a first operational state, and when the first device is in a second operational state and a second device is in a first operational state, and operating the engine at a second idle speed when the first device is in the second operational state and the second device is in a second operational state. The first idle speed is a low idle speed and the second idle speed is a high idle speed that is higher than the first idle speed, and the low idle speed is selected to provide reduced engagement torque to the second device and the high idle speed is selected to provide user desired acceleration performance.

20 Claims, 3 Drawing Sheets

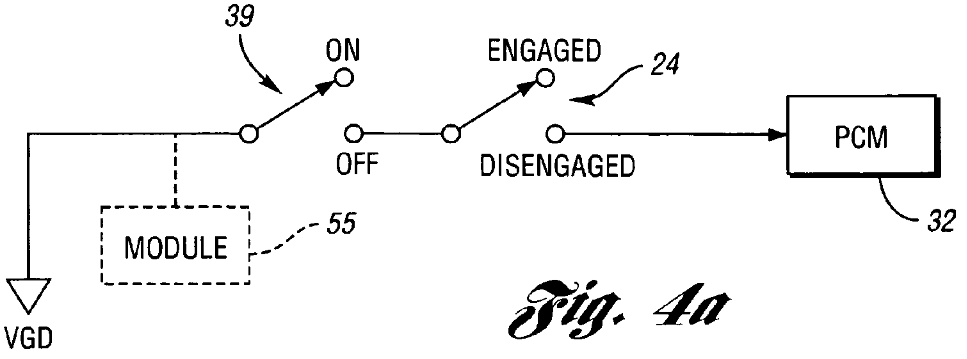
Fig. 4a
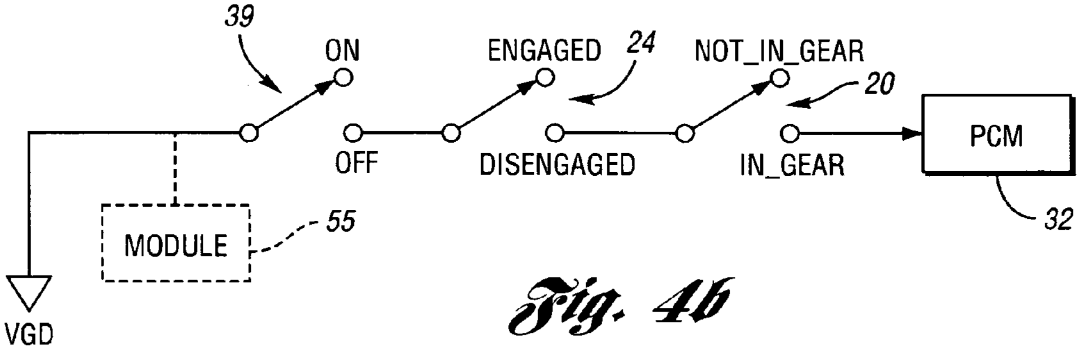
Fig. 4b
200
| OPERATIONAL STATE | | ENGINE, *10* IDLE SPEED, RPM |
|---|---|---|
| DEVICE (PARKING BRAKE), *39* | DEVICE (PUMP), *24* | |
| ON | ENGAGED | LOW, 700 |
| | DISENGAGED | LOW, 700 |
| OFF | ENGAGED | LOW, 700 |
| | DISENGAGED | HIGH, 800 |
| OFF | DISENGAGED AND TRANS., *20*, NOT_IN_GEAR | LOW, 700 |
| OFF | DISENGAGED AND TRANS., *20*, IN_GEAR | HIGH, 800 |
Fig. 5

SYSTEM AND METHOD FOR CONTROLLING ENGINE IDLE SPEED BASED ON OPERATIONAL STATE SETTINGS

BACKGROUND OF THE INVENTION

1. Field of the Invention

The present invention relates to a system and a method for controlling engine idle speed based on operational state settings.

2. Background Art

Engine emissions requirements have become increasingly stringent with the passage of increasingly restrictive air quality legislation as time has progressed. As engine control strategies are adjusted to meet increasingly tighter emissions regulations, desired customer vehicle acceleration performance is becoming increasingly difficult to achieve.

One conventional approach at attempting to provide desired customer vehicle acceleration performance is to increase engine idle speed. The increased engine idle speed is typically used when a vehicle is traveling (i.e., not parked and with the transmission in gear).

Further, when the vehicle where the engine is implemented is a fire truck, a relatively low engine idle speed is generally desirable to provide power (i.e., rotational torque and speed) to a water pump that provides pressurized water to hoses when the vehicle is parked (e.g., the parking brake is engaged) and the engine is at an idle state (or mode of operation). The reduced idle speed typically causes reduced engagement torque to the water pump. The water pump is typically driven by an auxiliary shaft (e.g., a power take off, PTO, drive shaft from the vehicle transmission) when the PTO (and hence the water pump) is engaged. Yet further, when the vehicle where the engine is implemented is a utility or industrial service (e.g., electric service, cable television service, forestry service, etc.) truck, a relatively low engine idle speed is generally desirable to provide power via the PTO drive shaft to any of accessories such as a hydraulic pump that provides pressurized oil to hydraulic mechanisms, an electrical power generator, a mechanical winch, a mechanical saw, and the like when the vehicle is parked.

Thus, there exists a need and an opportunity for an improved system and an improved method for engine idle speed control.

SUMMARY OF THE INVENTION

The present invention generally provides new, improved and innovative techniques for controlling engine idle speed. The present invention generally provides a system and a method for controlling engine idle speed based on operational state settings.

According to the present invention, a method for controlling idle speeds for an internal combustion engine is provided. The method comprises operating the engine at a first idle speed when a first device is in a first operational state, and when the first device is in a second operational state and a second device is in a first operational state, and operating the engine at a second idle speed when the first device is in the second operational state and the second device is in a second operational state. The first idle speed is a low idle speed and the second idle speed is a high idle speed that is higher than the first idle speed, and the low idle speed is selected to provide reduced engagement torque to the second device and the high idle speed is selected to provide user desired acceleration performance.

Also according to the present invention, a system for controlling idle speeds for an internal combustion engine is provided. The system comprises at least two inputs (e.g., sensors, switches, etc.) for providing an indication of operational states of two respective devices and an engine controller in communication with the inputs (e.g., sensors, switches, etc.). The engine controller is configured to operate the engine at a first idle speed when a first device is in a first operational state, and when the first device is in a second operational state and a second device is in a first operational state, and operate the engine at a second idle speed when the first device is in the second operational state and the second device is in a second operational state. The first idle speed is a low idle speed and the second idle speed is a high idle speed that is higher than the first idle speed, and the low idle speed is selected to provide reduced engagement torque to the second device and the high idle speed is selected to provide user desired acceleration performance.

Yet further according to the present invention, a computer-readable medium having stored thereon instructions is provided. The instructions which, when executed by a processor, cause the processor to perform the steps of operating an internal combustion engine at a first idle speed when a first device is in a first operational state, and when the first device is in a second operational state and a second device is in a first operational state, and operating the internal combustion engine at a second idle speed when the first device is in the second operational state and the second device is in a second operational state. The first idle speed is a low idle speed and the second idle speed is a high idle speed that is higher than the first idle speed, and the low idle speed is selected to provide reduced engagement torque to the second device and the high idle speed is selected to provide user desired acceleration performance.

The above features, and other features and advantages of the present invention are readily apparent from the following detailed descriptions thereof when taken in connection with the accompanying drawings.

BRIEF DESCRIPTION OF THE DRAWINGS

FIGS. 4(*a–b*) are diagrams illustrating detailed systems for engine idle speed control according to the present invention; and FIG. 5 is a table illustrating operational states of a system for engine idle speed control according to the present invention.

DETAILED DESCRIPTION OF THE PREFERRED EMBODIMENT(S)

With reference to the Figures, the preferred embodiments of the present invention will now be described in detail. Generally, the present invention provides an improved system and an improved method for engine idle speed control. The present invention generally provides a system and a method for controlling engine idle speed based on operational state settings. The present invention is generally implemented in connection with an internal combustion engine (e.g., a compression ignition or diesel engine) that is installed in a vehicle that comprises a fire truck, a utility or industrial service (e.g., electric service, cable television service, forestry service, etc.) truck, and the like where a relatively low engine idle speed is generally desirable to provide power via a power take off (PTO) drive shaft to accessories such as a water pump that provides pressurized water to hoses, a hydraulic pump that provides pressurized oil to hydraulic mechanisms, an electrical power generator, a mechanical winch, a mechanical saw, and the like when the vehicle is parked.

In particular, the present invention generally provides for a first (i.e., a low) engine idle speed during at least one mode of operation of a vehicle where the engine is installed and a second (i.e., a high) engine idle speed during at least one other mode of operation of the vehicle. The second engine idle speed is generally higher (i.e., at faster revolutions per minute, RPMs) than the first engine idle speed. As such, the engine idle speed control implemented in accordance with the system and method of the present invention may provide improved (i.e., reduced) PTO shaft engagement torque while providing improved vehicle acceleration and proper PTO drive shaft speed for respective applications when compared to conventional approaches.

To control or optimize at least one mode of the engine (e.g., an internal combustion engine in general and a compression ignition engine in particular) operation and engine idle speed where the respective operations are generally controlled by an electronic control module (ECM)/powertrain control module (PCM) or controller, the engine controller is generally adaptable (i.e., programmable, modifiable, configurable, etc.) to a variety of input signals, parameters, and desired modes of operation.

Figure 1:
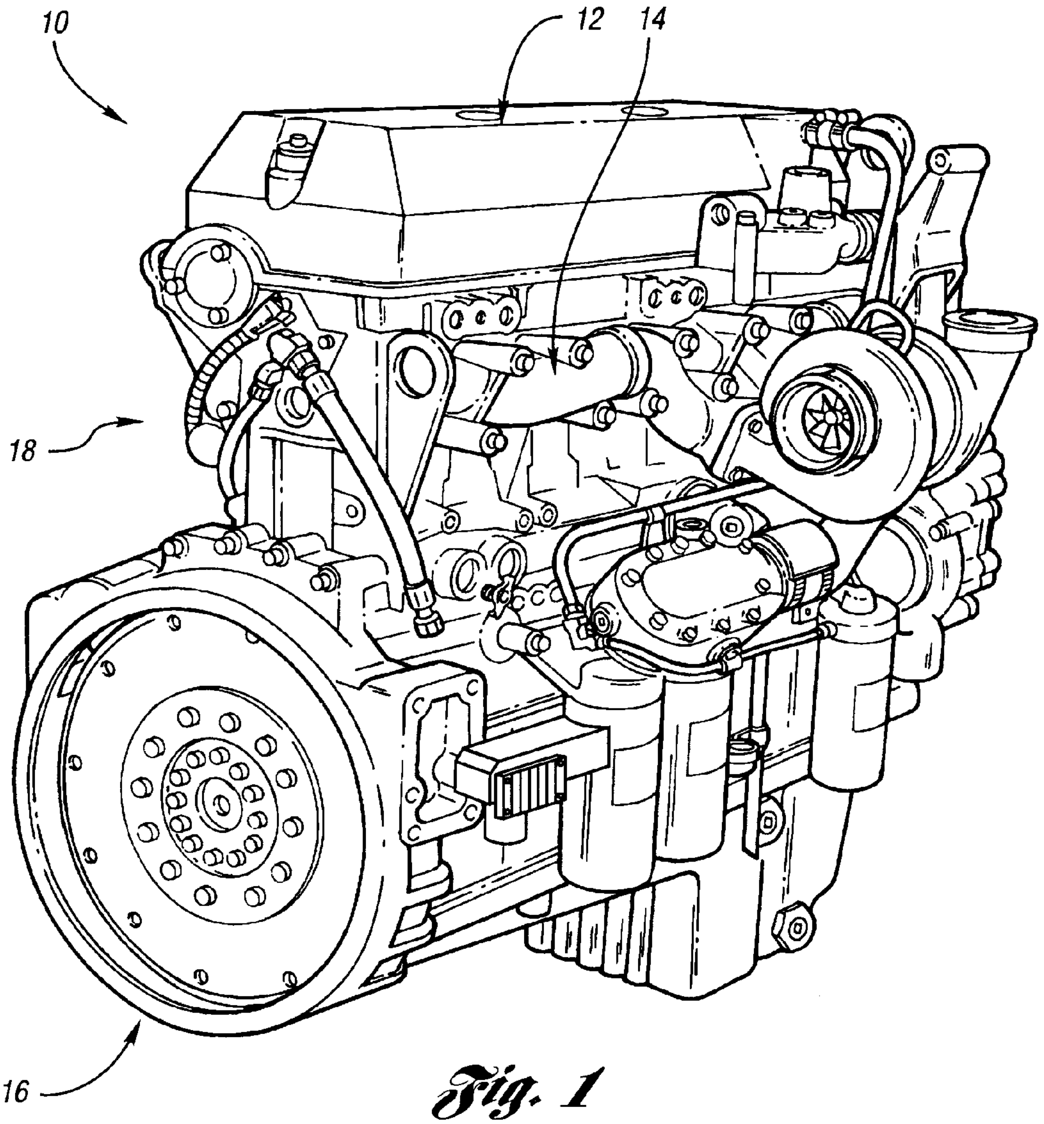
FIG. 1 is a diagram illustrating a compression ignition engine incorporating various features of the present invention.

Referring to FIG. 1, a perspective view illustrating a compression-ignition internal combustion engine 10 incorporating various features according to the present invention is shown. The engine 10 may be implemented in a wide variety of applications including on-highway trucks, fire trucks, utility or industrial service trucks, construction equipment, marine vessels, stationary generators, pumping stations, and the like (not shown). The engine 10 generally includes a plurality of cylinders disposed below a corresponding cover, indicated generally by reference numeral 12.

In a preferred embodiment, the engine 10 is a multi-cylinder compression ignition internal combustion engine, such as a 3, 4, 6, 8, 12, 16, or 24 cylinder diesel engine. However, the engine 10 may be implemented having any appropriate number of cylinders 12, the cylinders having any appropriate displacement and compression ratio to meet the design criteria of a particular application. Moreover, the present invention is not limited to a particular type of engine or fuel. The present invention may be implemented in connection with any appropriate engine (e.g., Otto cycle, Rankine cycle, Miller cycle, etc.) using an appropriate fuel to meet the design criteria of a particular application. An exhaust gas recirculation (EGR) valve (not shown) is generally connected between an exhaust manifold 14 and an intake manifold (not shown). The EGR valve generally provides recirculation of a portion of exhaust gas in response to at least one predetermined engine 10 operating condition.

The engine 10 generally includes an engine control module (ECM), powertrain control module (PCM), or other appropriate controller 32 (described in detail in connection with FIG. 3). The ECM 32 generally communicates with various engine sensors and actuators via associated interconnection cabling or wires 18, to control the engine 10 and at least one engine 10 idle speed (e.g., a low engine idle speed and a high engine idle speed). In addition, the ECM 32 generally communicates with an engine operator (e.g., driver, user, not shown) using associated actuators, pedals, levers, lights, switches, displays, and the like (described in more detail in connection with FIG. 3).

Figure 2:
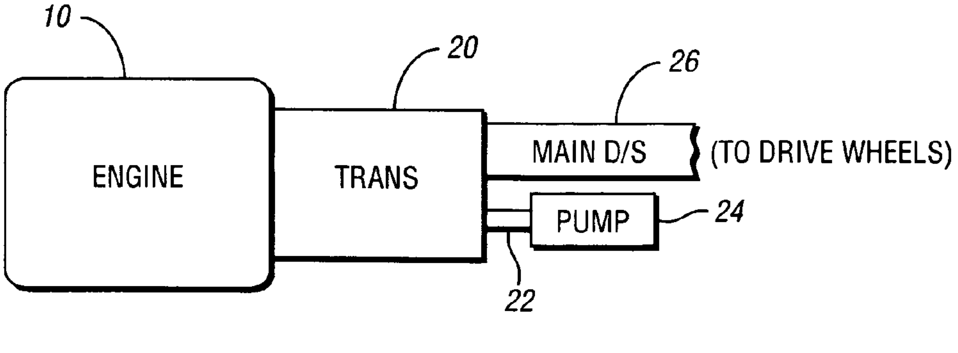
FIG. 2 is a diagram illustrating a powertrain system according to the present invention.

Referring to FIG. 2, a diagram illustrating a portion of a powertrain of the present invention is shown. In one example, the engine 10 may be mounted (i.e., installed, implemented, positioned, disposed, etc.) in a vehicle (not shown). In another example, the engine 10 may be installed in a stationary environment. The engine 10 may be coupled to a transmission 20 via a flywheel 16 (shown in FIG. 1).

The transmission 20 generally includes a power take off (PTO) configuration where an auxiliary shaft (or PTO shaft) 22 may be connected (or coupled) to associated (or respective) auxiliary equipment including a device (e.g., a water pump, a hydraulic fluid pump, a winch, an electrical generator, etc.) 24. A main drive shaft (D/S) 26 is generally connected (or coupled) to drive wheels (not shown). The transmission 20 is generally in an "in gear" state (i.e., condition, mode of operation, etc.) and connected to the D/S 26 when the vehicle where the powertrain of the present invention is implemented is traveling (or moving).

The PTO shaft 22 generally provides power (i.e., a rotational torque and speed) to the pump 24. The pump 24 generally provides pressurized fluid to an appropriate auxiliary equipment (e.g., fire hoses, not shown) when the vehicle where the engine 10 is installed is stationary and parked (e.g., the parking brake is engaged) and the engine 10 is at one or more idle states (or modes of operation). When the vehicle where the engine 10 is implemented is a fire truck, a relatively low engine idle speed is generally desirable to provide power (i.e., rotational torque and speed) to a water pump 24 that provides pressurized water to hoses when the vehicle is stationary and parked. The water pump 24 is typically driven (i.e., powered, operated, etc.) by the auxiliary shaft 22 when the PTO (and hence the water pump 24) is engaged.

Yet further, when the vehicle where the engine 10 is implemented is a utility (e.g., electric service, cable television service, etc.) service truck, a relatively low engine idle speed is generally desirable to provide power via the PTO drive shaft 22 to a hydraulic pump 24 that provides pressurized oil to hydraulic mechanisms when the vehicle is stationary and parked. Similar installations of the engine 10 generally have similarly desired idle speed control operation. To achieve user desired acceleration performance, an engine 10 idle speed that is higher than the idle speed that is implemented when the vehicle where the present invention is implemented is stationary and parked and the device 24 is engaged.

The auxiliary equipment 24 may be driven by the engine 10/transmission 20/PTO shaft 22 combination at a relatively constant rotational speed using an engine variable speed governor (VSG) feature (i.e., mode of operation) that may be implemented in connection with the engine 10 and the controller 32. The auxiliary equipment may include hydraulic pumps for construction equipment, water pumps for fire engines, power generators, and any of a number of other rotationally driven accessories. Typically, when the PTO apparatus 22 and the driven device 24 are installed on a vehicle, the PTO mode is generally used while the vehicle is stationary.

Figure 3:
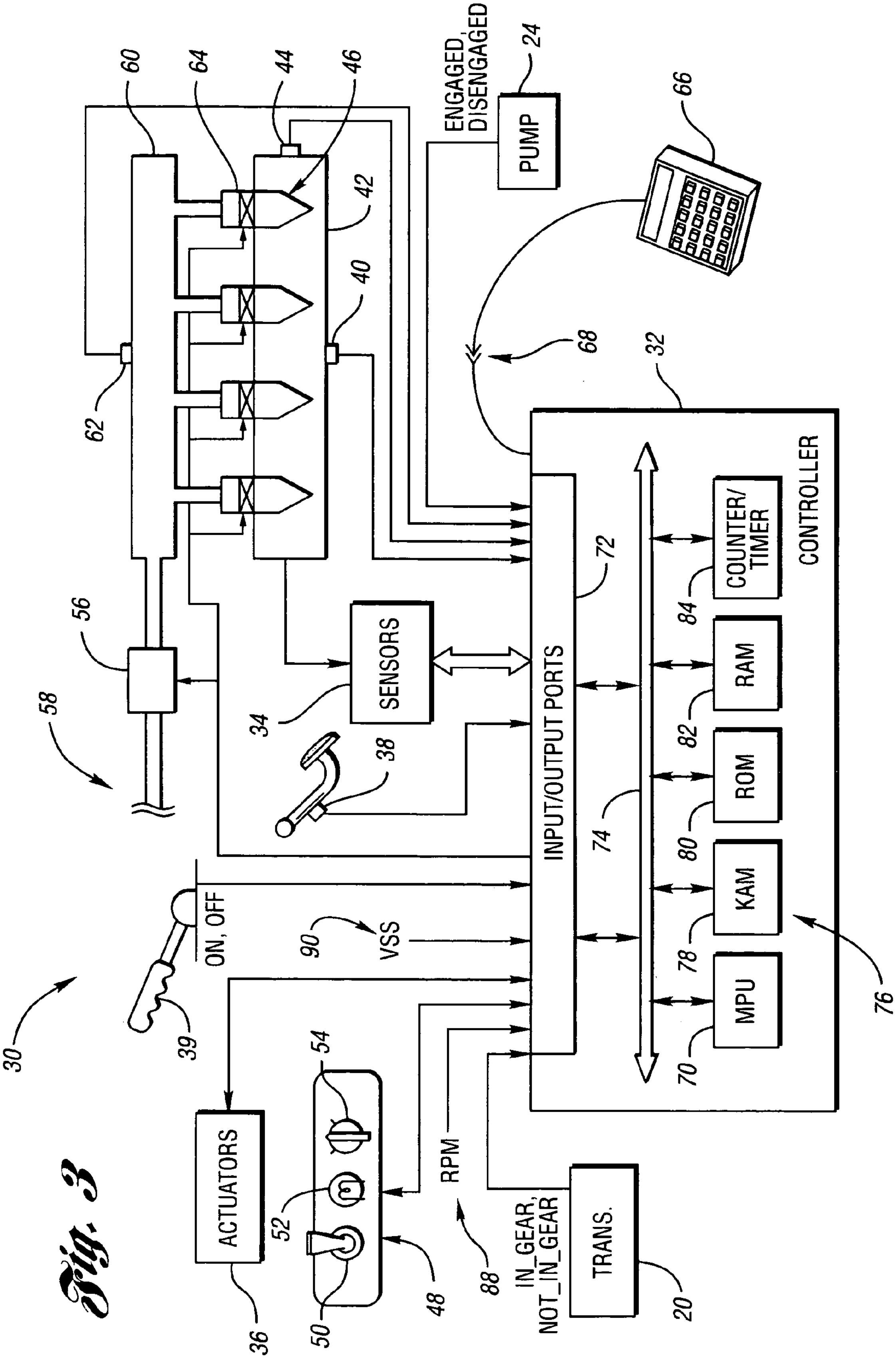
FIG. 3 is a diagram illustrating a system for engine idle speed control according to the present invention.

Referring to FIG. 3, a diagram illustrating a system 30 for controlling an engine and for controlling at least one engine idle speed (generally two or more idle speeds) according to the present invention is shown. The system 30 may be implemented in connection with the engine 10 of FIG. 1 and the powertrain system of FIG. 2. The system 30 preferably includes the controller (e.g., ECM, PCM, and the like) 32 in communication with various sensors (e.g., switches, transducers, input devices, etc.) 34 and actuators 36. The sensors 34 may include various position, condition, or operational state sensors such as an accelerator or service brake position sensor 38, a sensor that indicates (i.e., generates, provides or presents a signal or input) when the device (i.e., transmission) 20 is in gear and not in gear, a sensor that indicates when the device (or other appropriate apparatus, pump, equipment, etc.) 24 is engaged and disengaged, and a parking brake 39 (or other appropriate apparatus, device, equipment, etc.) engagement (i.e., activation, on/off state, etc.).

When the transmission is in gear (i.e., engaged, activated, on, etc.) the related sensor generally presents a signal (e.g., IN_GEAR). When the transmission is not in gear (i.e., disengaged, deactivated, etc.) the related sensor generally presents a signal (e.g., NOT_IN_GEAR).

When the parking brake 39 is set (i.e., engaged, activated, on, etc.) the related sensor generally presents a signal (e.g., ON). When the parking brake 39 is not set (i.e., disengaged, deactivated, off, etc.) the related sensor generally presents a signal (e.g., OFF). When the PTO 22 (and hence the pump 24) is engaged (i.e., activated, on, etc.) the related sensor generally presents a signal (e.g., ENGAGED). When the PTO 22 (and hence the pump 24) is disengaged (i.e., deactivated, off, etc.) the related sensor generally presents a signal (e.g., DISENGAGED).

The signals ON, OFF, ENGAGED, DISENGAGED, IN_GEAR, and NOT_IN_GEAR may be presented as digital (i.e., logic control, logical on/off, logical High/Low, logical 1/0, etc.) signals that may be received by the controller 32. The signals ON, OFF, ENGAGED, DISENGAGED, IN_GEAR, and NOT_IN_GEAR may be used by the controller 32 to control at least one idle speed of the engine 10 (described in more detail in connection with FIGS. 4 and 5).

Likewise, the sensors 34 may include a coolant temperature sensor 40 that generally provides an indication of the temperature of an engine block 42 and an intake manifold air temperature sensor that generally provides an indication of the temperature of the engine intake air at the inlet or within the intake manifold. An oil pressure sensor 44 may be used to monitor the engine 10 operating conditions by providing an appropriate signal to the controller 32. Other sensors (not shown) may include at least one sensor that indicates actuation of an EGR control valve (not shown), at least one sensor that indicates actuation of at least one engine cooling fan (not shown), and at least one sensor (not shown) that indicates rotational speed of the at least one cooling fan.

Other sensors may include rotational sensors to detect the rotational speed of the engine 10, such as RPM sensor 88 and a vehicle speed sensor (VSS) 90 in some applications. The VSS 90 generally provides an indication of the rotational speed of the output shaft or (tailshaft) 26 of the transmission 20. The speed of the shaft monitored via the VSS 90 may be used to calculate the vehicle speed. The VSS 90 may also represent one or more wheel speed sensors which may be used in anti-lock breaking system (ABS) applications, vehicle stability control systems, and the like. The VSS 90 may further be implemented to indicate the rotational speed of the PTO shaft 22.

The actuators 36 may include various engine components which are operated via associated control signals from the controller 32. The various actuators 36 may also provide signal feedback to the controller 32 relative to the actuator 36 operational state, in addition to feedback position or other signals used to the control actuators 36. The actuators 36 preferably include a plurality of fuel injectors 46 which are controlled via associated (or respective) solenoids 64 to deliver fuel to the corresponding cylinders 12. The actuators 36 may include at least one actuator that may be implemented to control the PTO shaft 22 (i.e., engagement/disengagement of the device 24).

In one embodiment, the controller 32 controls a fuel pump 56 to transfer fuel from a source 58 to a common rail or manifold 60 at a fuel pressure that may be monitored via a pressure sensor 62. However, in another example, the present invention may be implemented in connection with a direct injection engine. Operation of the solenoids 64 generally controls delivery of the timing and duration of fuel injection (i.e., an amount, timing and duration of fuel). While the representative control system 30 illustrates an example application environment of the present invention, as noted previously the present invention is not limited to any particular type of fuel or fueling system and thus may be implemented in any appropriate engine and/or engine system to meet the design criteria of a particular application.

The sensors 34 and the actuators 36 may be used to communicate status and control information to the engine operator via a console 48. The console 48 may include various switches 50 and 54 in addition to indicators 52. The console 48 is preferably positioned in close proximity to the engine operator, such as in a cab (i.e., passenger compartment, cabin, etc.) of the vehicle (or environment) where the system 30 is implemented. The indicators 52 may include any of a number of audio and visual indicators such as lights, displays, buzzers, alarms, and the like. Preferably, one or more switches, such as the switch 50 and the switch 54, may be used to request at least one particular operating mode, such as climate control (e.g., air conditioning), cruise control or PTO mode, for example.

As used throughout the description of the present invention, at least one selectable (i.e., programmable, predetermined, modifiable, etc.) limit (i.e., threshold, level, interval, value, amount, duration, etc.) or range of values may be selected by any of a number of individuals (i.e., users, operators, owners, drivers, etc.) via a programming device, such as device 66 selectively connected via an appropriate plug or connector 68 to the controller 32. Rather than being primarily controlled by software, the selectable or programmable limit (or range) may also be provided by an appropriate hardware circuit having various switches, dials, and the like. Alternatively, the selectable or programmable limit may also be changed using a combination of software and hardware without departing from the spirit of the present invention. However, the at least one selectable value or range may be predetermined and/or modified by any appropriate apparatus and method to meet the design criteria of a particular application. Any appropriate number and type of sensors, indicators, actuators, etc. may be implemented to meet the design criteria of a particular application.

In one embodiment, the controller 32 generally includes a programmable microprocessing unit (e.g., controller, processor, etc.) 70 in communication with the various sensors 34 and the actuators 36 via at least one input/output port 72. The input/output ports 72 may provide an interface in terms of processing circuitry to condition the signals, protect the controller 32, and provide appropriate signal levels depending on the particular input or output device. The processor 70 generally communicates with the input/output ports 72 using a data/address bus arrangement 74. Likewise, the controller

70 generally communicates with various types of computer-readable storage media 76 which may include a keep-alive memory (KAM) 78, a read-only memory (ROM) 80, a random-access memory (RAM) 82, and at least one timer (or a counter configured as a timer) 84.

The various types of computer-readable storage media 76 generally provide short-term and long-term storage of data (e.g., at least one lookup table, LUT, at least one operation control routine, etc.) used by the controller 32 to control the engine 10 and the PTO shaft 22. The computer-readable storage media 76 may be implemented by any of a number of known physical devices capable of storing data representing instructions executable by the controller 70. Such devices may include PROM, EPROM, EEPROM, flash memory, and the like in addition to various magnetic, optical, and combination media capable of temporary and/or permanent data storage.

The computer-readable storage media 76 may include data representing program instructions (e.g., software), calibrations, routines, steps, methods, blocks, operations, operating variables, and the like used in connection with associated hardware to control the various systems and subsystems, and modes of operation (e.g., at least one and generally two or more idle states) of the engine 10, the PTO (or auxiliary) shaft 22, and the vehicle. The engine/idle state (or mode) control logic is generally implemented via the controller 32 based on the data stored in the computer-readable storage media 76 in addition to various other electric and electronic circuits (i.e., hardware, firmware, etc.).

In one example, the controller 32 includes control logic to control at least one idle mode of operation of the engine 10. Modes of engine 10 operation that may be controlled include engine idle, PTO operation, engine shutdown, maximum permitted vehicle speed, maximum permitted engine speed (i.e., maximum engine RPM), whether the engine 10 may be started (i.e., engine start enable/disable), engine operation parameters that affect engine emissions (e.g., timing, amount and duration of fuel injection, exhaust air pump operation, etc.), cruise control enable/disable, seasonal shutdowns, calibration modifications, and the like.

Referring to FIG. 4*a,* a diagram illustrating an idle speed control apparatus (i.e., control logic) of the present invention is shown. In one example, the engine 10 idle speed may be controlled by the PCM 32 in connection with the sensor related to the pump (or device) 24 and the sensor related to the parking brake (or device) 39. In another example, the engine 10 idle speed may be controlled by the PCM 32 in connection with the sensor related to the pump 24, the sensor related to the parking brake 39, and a module 55 (shown in phantom).

The PCM 32 may have a terminal (e.g., when the PCM 32 is implemented as a Detroit Diesel Corporation, DDEC controller, an Alt Min VSG terminal) that may be connected to a first terminal of the pump 24 sensor, the pump 24 sensor may have a second terminal that may be connected to a first terminal of the parking brake 39 sensor, and the parking brake 39 sensor may have a second terminal that, in one example, may receive an electrical ground potential (e.g., VGD, and when the PCM is implemented as a Detroit Diesel Corporation, DDEC controller the electrical ground potential may be a 953 terminal), and, in another example, may be connected to a terminal of the module 55. The PCM 32, the sensor related to the pump 24, the sensor related to the parking brake 39 and, in one example the ground potential VGD, and, in another example, the module 55 are generally electrically serially coupled.

In one example, the module 55 may provide an electrical path to the ground potential VGD. In another example, the module 55 may provide an electrical path to an electrical potential (or signal) other than the ground potential.

Referring to FIG. 4*b,* a diagram illustrating another idle speed control apparatus (i.e., control logic) of the present invention is shown. In another example, the engine 10 idle speed may be controlled by the PCM 32 in connection with the sensor related to the transmission (or device) 20, the sensor related to the pump (or device) 24, and the sensor related to the parking brake (or device) 39. The sensor related to the transmission 20 may have a first terminal that may be connected to the terminal of the controller 32 and a second terminal that may be connected to the first terminal of the pump 24 sensor. The PCM 32, the sensor related to the transmission 20, the sensor related to the pump 24, the sensor related to the parking brake 39 and, in one example the ground potential VGD, and, in another example, the module 55 are generally electrically serially coupled (e.g., connected to perform a logical AND operation).

Referring to FIG. 5, a table 200 illustrating operational states of the system 30 for engine idle speed control according to the present invention is shown. The signals ON, OFF, ENGAGED, DISENGAGED, IN_GEAR, and NOT_IN_GEAR (i.e., signals that are presented as representative of the operational states (i.e., conditions, modes of operation, etc.) of the device 20, the device 24 and the device 39) may be used by the controller 32 to control at least one idle speed of the engine 10. That is, the idle speed of the engine 10 may be determined (i.e., set, operated, chosen, selected, etc.) in response to the operational conditions of the device 20, the device 24 and the device 39.

When the device (parking brake) 39 is on, the engine 10 may be controlled to operate at a low idle speed regardless of whether the device (i.e., pump, auxiliary equipment, etc.) 24 is engaged. When the parking brake 39 is off and the pump 24 is engaged, the engine 10 may be controlled to operate at the low idle speed. When the parking brake 39 is off and the pump 24 is disengaged, the engine 10 may be controlled to operate at a high idle speed. When the parking brake 39 is off and the pump 24 is disengaged and the transmission 20 is in gear, the engine 10 may be controlled to operate at the high idle speed. When the parking brake 39 is off and the pump 24 is disengaged and the transmission 20 is not in (i.e., out of) gear, the engine 10 may be controlled to operate at the low idle speed. The low idle speed is generally low relative to the high idle speed, that is, the low idle speed is less than the high idle speed.

In one example, the low idle speed may be nominally about (i.e., approximately, essentially, substantially, etc.) 700 RPM and the high idle speed may be nominally about (i.e., approximately, essentially, substantially, etc.) 800 RPM. The low idle speed and the high idle speed may have a preferred range of plus to minus 25 RPM from the nominal value and a most preferred range of plus to minus 10 RPM from the nominal value. However, the low idle speed and the high idle speed may have any appropriate nominal and range values to meet the design criteria of a particular application.

As is readily apparent from the foregoing description, then, the present invention generally provides an improved apparatus (e.g., the system 30) and an improved method for controlling engine idle speed. The improved system and method of the present invention may provide reduced PTO shaft engagement torque (e.g., via the low engine idle speed) while providing improved user desired vehicle acceleration performance (e.g., via the high engine idle speed) when compared to conventional approaches.

While the control signals of the present invention may be implemented as set when the signal is "on", enabled, asserted, presented, transmitted, at a logic TRUE, HIGH or "1" state or level, etc., the control signals may be set when "off", disabled, de-asserted, not presented, not transmitted, at a logic FALSE, LOW or "0" state or level, etc., or alternatively, any of the control signal states may be reversed or inverted to meet the design criteria of a particular application.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for controlling idle speeds for an internal combustion engine, the method comprising:

operating the engine at a first idle speed when a first device is in a first operational state, and when the first device is in a second operational state and a second device is in a first operational state; and operating the engine at a second idle speed when the first device is in the second operational state and the second device is in a second operational state, wherein the first idle speed is a low idle speed and the second idle speed is a high idle speed that is higher than the first idle speed, and the low idle speed is selected to provide reduced engagement torque to the second device and the high idle speed is selected to provide user desired acceleration performance.

2. The method of claim 1 wherein the engine comprises a compression ignition engine.

3. The method of claim 1 wherein the first device comprises a parking brake, and the second device comprises at least one of a water pump, a hydraulic fluid pump, a winch, and an electrical generator.

4. The method of claim 3 wherein the first operational state of the parking brake is an on condition, the second operational state of the parking brake is an off condition, the first operational state of the second device is an engaged condition, and the second operational state of the second device is a disengaged condition.

5. The method of claim 4 wherein the engine is operated at the second idle speed when a transmission is in gear.

6. The method of claim 1 wherein the engine is implemented in connection with at least one of a fire truck and a utility service truck.

7. The method of claim 1 wherein the second device is connected to the engine via a transmission using power take off drive shaft.

8. The method of claim 1 wherein the low idle speed is nominally about 700 RPM and the high engine idle speed is nominally about 800 RPM.

9. The method of claim 8 wherein the low idle speed and the high idle speed have a preferred range of plus to minus 25 RPM from the respective nominal values and a most preferred range of plus to minus 10 RPM from the respective nominal values.

10. A system for controlling idle speeds for an internal combustion engine, the system comprising:

at least two sensors for providing an indication of operational states of two respective devices; and an engine controller in communication with the sensors, the engine controller configured to, operate the engine at a first idle speed when a first device is in a first operational state, and when the first device is in a second operational state and a second device is in a first operational state; and operate the engine at a second idle speed when the first device is in the second operational state and the second device is in a second operational state, wherein the first idle speed is a low idle speed and the second idle speed is a high idle speed that is higher than the first idle speed, and the low idle speed is selected to provide reduced engagement torque to the second device and the high idle speed is selected to provide user desired acceleration performance.

11. The system of claim 10 wherein the engine comprises a compression ignition engine.

12. The system of claim 10 wherein the first device comprises a parking brake, and the second device comprises at least one of a water pump, a hydraulic fluid pump, a winch, and an electrical generator.

13. The system of claim 12 wherein the first operational state of the parking brake is an on condition, the second operational state of the parking brake is an off condition, the first operational state of the second device is an engaged condition, and the second operational state of the second device is a disengaged condition.

14. The system of claim 13 wherein the engine is operated at the second idle speed when a transmission is in gear.

15. The system of claim 10 wherein the engine is implemented in connection with at least one of a fire truck and a utility service truck.

16. The system of claim 10 wherein the second device is connected to the engine via a transmission using power take off drive shaft.

17. The system of claim 10 wherein the low idle speed is nominally about 700 RPM and the high engine idle speed is nominally about 800 RPM.

18. The system of claim 17 wherein the low idle speed and the high idle speed have a preferred range of plus to minus 25 RPM from the respective nominal values and a most preferred range of plus to minus 10 RPM from the respective nominal values.

19. The system of claim 10 wherein the engine controller and the two sensors are electrically serially coupled to at least one of a ground potential and a module.

20. A computer-readable medium having stored thereon instructions which, when executed by a processor, cause the processor to perform the steps of:

operating an internal combustion engine at a first idle speed when a first device is in a first operational state, and when the first device is in a second operational state and a second device is in a first operational state; and operating the internal combustion engine at a second idle speed when the first device is in the second operational state and the second device is in a second operational state, wherein the first idle speed is a low idle speed and the second idle speed is a high idle speed that is higher than the first idle speed, and the low idle speed is selected to provide reduced engagement torque to the second device and the high idle speed is selected to provide user desired acceleration performance.

* * * * *